United States Patent
Miklas

(10) Patent No.: US 8,641,004 B2
(45) Date of Patent: Feb. 4, 2014

(54) COLLAPSIBLE BAG FOR AUTOMOTIVE CUP HOLDER

(75) Inventor: John L. Miklas, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 149 days.

(21) Appl. No.: 13/301,087

(22) Filed: Nov. 21, 2011

(65) Prior Publication Data

US 2013/0126691 A1 May 23, 2013

(51) Int. Cl.
*A47K 1/08* (2006.01)

(52) U.S. Cl.
USPC .......................... 248/311.2; 248/315; 224/250

(58) Field of Classification Search
USPC ............. 248/311.2, 315, 316.1, 316.2, 316.6, 248/316.7, 316.8; 224/250
See application file for complete search history.

(56) References Cited

U.S. PATENT DOCUMENTS

| | | |
|---|---|---|
| 5,639,052 A | 6/1997 | Sauve |
| 6,024,395 A | 2/2000 | Kang |
| 6,045,017 A * | 4/2000 | Connell ...................... 224/148.7 |
| 6,318,689 B1 * | 11/2001 | Rodriguez .................. 248/311.2 |
| 6,405,881 B1 * | 6/2002 | Park ........................... 211/71.01 |
| D461,996 S * | 8/2002 | Liao ................................ D7/620 |
| 8,066,148 B2 * | 11/2011 | Garahan ....................... 220/737 |
| 2002/0145096 A1 * | 10/2002 | Eubanks .................... 248/311.2 |
| 2005/0167557 A1 * | 8/2005 | Winckels ................... 248/311.2 |
| 2008/0164179 A1 * | 7/2008 | Douglas ....................... 206/570 |
| 2009/0206099 A1 | 8/2009 | Davis |

FOREIGN PATENT DOCUMENTS

| | | |
|---|---|---|
| DE | 10060798 A1 | 6/2002 |
| JP | 2009280005 A | 12/2009 |

* cited by examiner

*Primary Examiner* — Terrell McKinnon
*Assistant Examiner* — Steven Marsh
(74) *Attorney, Agent, or Firm* — Vichit Chea; MacMillan, Sobanski & Todd, LLC

(57) ABSTRACT

A cup holder for beverage containers has a deployable tray movable between a deployed position and a stowed position. The tray has an upper surface, a lower surface, and an aperture. A cup insert includes a cup ring, a cup bag, and a coil spring. The cup ring has an open collar for receiving a beverage container and has a seating flange configured to rest on the upper surface. The cup bag is made of flexible material having a generally cylindrical shape between an upper rim and a bag bottom. The upper rim is affixed to the open collar. A coil spring is coupled between the cup ring and the bottom end for urging them together for collapsing the cup bag. The coil spring is expandable under the weight of a beverage container placed on the bag bottom.

17 Claims, 5 Drawing Sheets

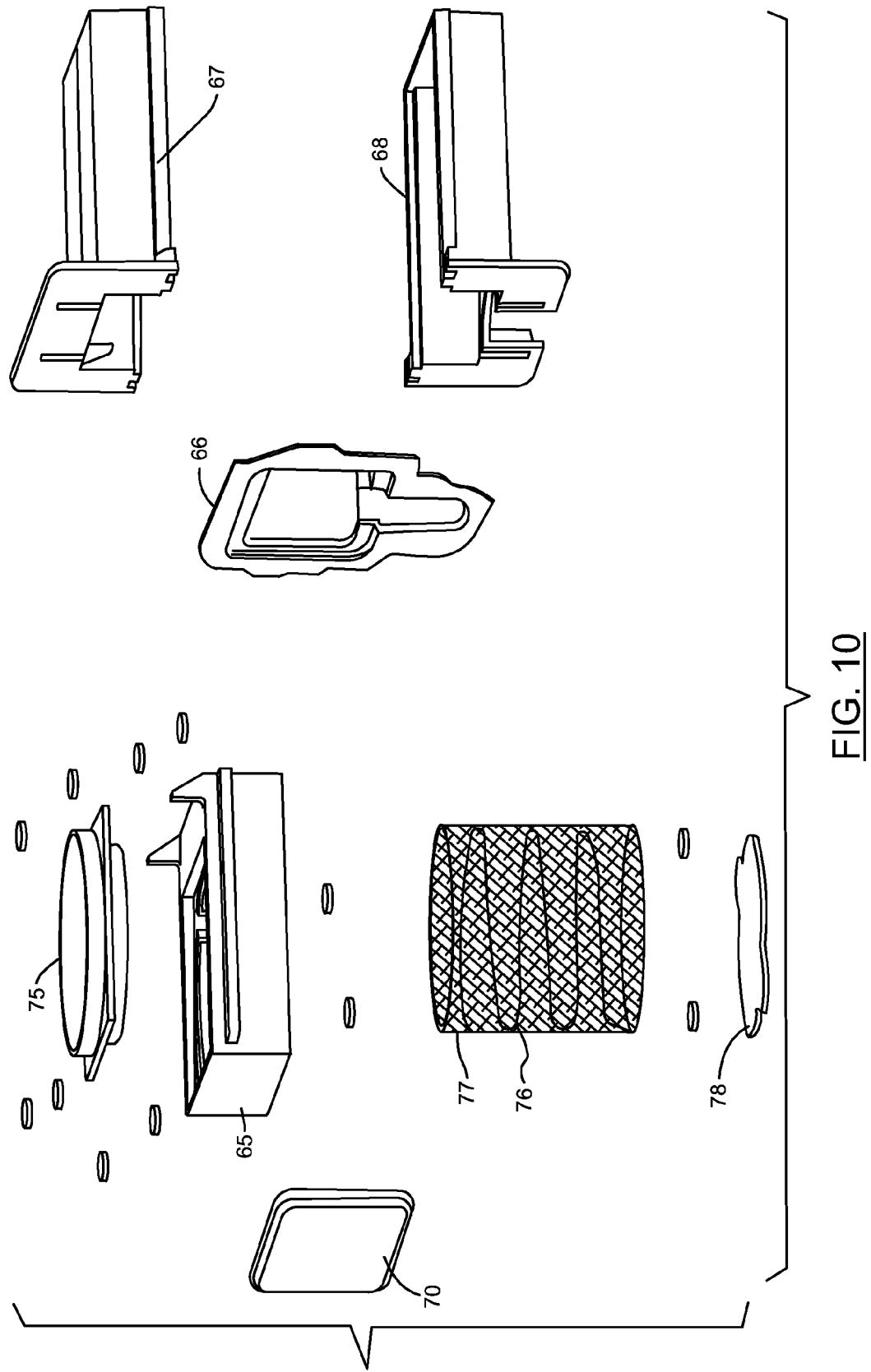

COLLAPSIBLE BAG FOR AUTOMOTIVE CUP HOLDER

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to cup holders for use in automobiles, theaters, and other seating areas, and, more specifically, to a stowable cup holder that occupies very little space and can be deployed outward from a vertical panel.

Readily accessible and plentiful cup holders are desired by users of vehicles and other seating environments such as theaters and stadiums In some locations such as the rear seats of a vehicle passenger compartment, the locations for placing a conventional cup holder have been very limited due to the absence of horizontal surfaces and the lack of depth behind the available vertical surfaces (such as the trim surface of a side door or the back surface of the front passenger seats or console). Due to the limited area and the potential interference of a cup holder with a passenger's movements into or out of their seat (especially for a rear seat passenger), it is also desirable to make the cup holder stowable into the door panel or other vertical surface.

Many prior attempts to package cup holders in these locations have produced flimsy cup holders which lack structural integrity, are difficult to use, and are difficult to clean. It would be desirable to provide a cup holder that efficiently uses the limited packaging space available, has good mechanical strength, and is removable for cleaning.

SUMMARY OF THE INVENTION

The invention is a cup holder with a collapsible bag to provide a low profile for stowing/retracting the cup holder into a door panel, quarter trim, console, instrument panel, or other vertical surfaces in a vehicle or other seating environments. The bag may be waterproof and removable for cleaning. A coil spring in the bag expands it for use, and magnetic retainers may be used to maintain the bag in a collapsed position for storage.

In one aspect of the invention, a cup holder is provided for beverage containers. A deployable tray is movable between a deployed position and a stowed position, the tray having an upper surface, a lower surface, and an aperture. A cup insert includes a cup ring, a cup bag, and a coil spring. The cup ring has an open collar for receiving a beverage container and has a seating flange configured to rest on the upper surface. The cup bag is made of flexible material having a generally cylindrical shape between an upper rim and a bag bottom. The upper rim is affixed to the open collar. A coil spring is coupled between the cup ring and the bag bottom for urging them together for collapsing the cup bag. The coil spring is expandable under the weight of a beverage container placed on the bag bottom.

BRIEF DESCRIPTION OF THE DRAWINGS

FIG. 10 is an exploded view of the cup holder of FIGS. 6-9.

DETAILED DESCRIPTION OF PREFERRED EMBODIMENTS

Figure 1:
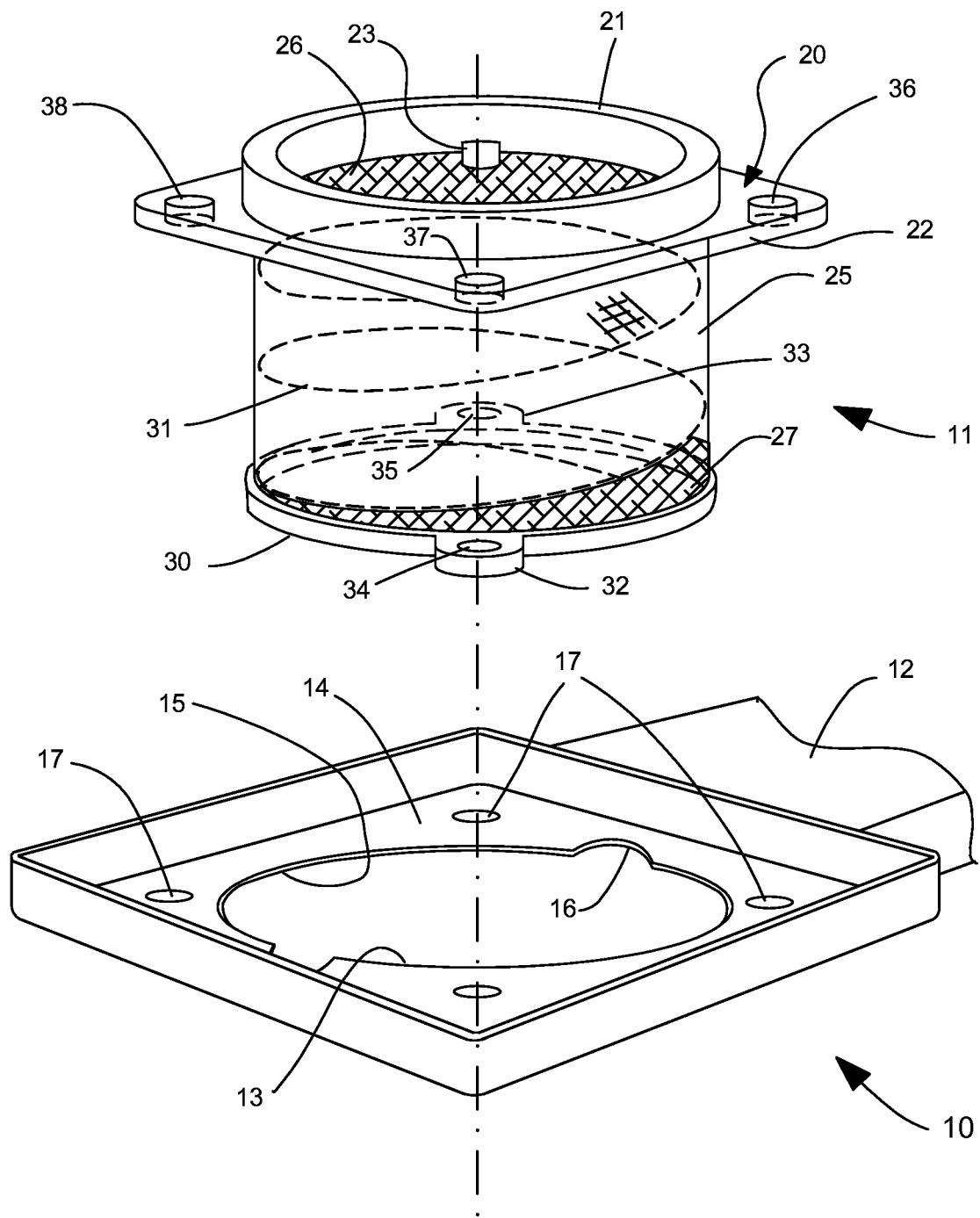
FIG. 1 is a perspective view of a cup holder system according to one embodiment of the invention.

Referring now to FIG. 1, a tray 10 receives a cup insert 11 for holding various beverage containers such as cans, cups, and bottles. Tray 10 is preferably deployable from a vertical panel (not shown) via a support 12. Tray 10 is generally planar with a central aperture 13 between an upper surface 14 and a lower surface 15. The outer perimeter of tray 10 is generally square and has perimeter walls. Aperture 13 is generally circular with one or more notches 16 to facilitate insertion and removal of insert 11 as explained below. Permanent magnets 17 are embedded between the upper and lower surfaces 14/15 at the corners of tray 10 for retaining insert 11 as also explained below. Insert 11 has a cup ring member 20 that includes an open collar 21 and a seating flange 22. Flange 22 is adapted to rest on upper surface 14 of tray 10. Open collar 21 has a central aperture for receiving beverage containers and may include one or more flexible flaps 23 for applying a stabilizing force to the beverage containers.

Insert 11 further includes a cup bag 25 made of a flexible material with a generally cylindrical shape between an upper rim 26 and a bag bottom 27. The flexible material may comprise woven nylon or Gore-Tex®, for example. Upper rim 26 is affixed to insert 11 within open collar 21. Insert 11 may be molded from a thermoplastic elastomer or synthetic rubber, so that upper rim 26 of bag 25 can be insert molded into collar 21. Bag bottom 27 is affixed to a bottom plate 30 that provides the bottom support for a beverage container. Bag bottom 27 may preferably be a closed end, but can alternatively be an open end when the end is closed by bottom plate 30. Bottom plate 30 is optional when bag bottom 27 is itself closed.

Bag bottom 27 may be sewn to bottom plate 30, insert molded, or attached by other known means including gluing. Preferably, a hermetic seal would be formed between an open bag bottom 27 and bottom plate 30 so that liquid leaked from the beverage container is kept within the cup holder.

A coil spring 31 is connected between insert 11 and bag bottom 27 (or alternatively bottom plate 30) having a relaxed position corresponding to the collapsed state of cup bag 25. Spring 31 naturally retracts in order to collapse bag 25 and bring bottom plate 30 into close proximity to insert 11. Spring 31 is contained within bag 25. Bag 25 may preferably have multiple concentric layers with spring 31 located between the layers. The spring force of spring 31 is sufficiently low that the weight of a beverage container is enough to cause spring 31 to expand, thereby opening a recess to hold the beverage container.

Bottom plate 30 has radially-extending lateral tabs 32 and 33 which project at an angle toward respective corners of seating flange 22. Lateral tabs 32 and 33 include embedded magnetically permeable discs 34 and 35. Likewise, each corner of seating flange 22 has an embedded magnetically permeable disc 36-38. The magnetically permeable discs are axially aligned with permanent magnets 17 when insert 11 is inserted into tray 10. The discs and permanent magnets form magnetic retainers to releasably secure ring member 20 to upper surface 14 of tray 10 and to releasably secure bottom plate 30 to lower surface 15 of tray 10. This helps ensure that when no beverage container is loaded into bag 25, the cup holder has its minimum profile and can be retracted to a stowed position behind a trim panel as explained below.

Bottom plate 30 generally has a diameter smaller than the diameter of aperture 13 except for lateral tabs 32 and 33. In order to mount insert 11 into tray 10, insert 11 may be rotated in order to align lateral tabs 32 and 33 with corresponding notches 16 so that bottom plate 30 passes through aperture 13. Then insert 11 is rotated to align flange 22 so its corners can enter the corners of tray 10 whereby permanent magnets 17 retain discs 36-38. Simultaneously, lateral tabs 32 and 33 become aligned with permanent magnets 17 at lower surface 15 of tray 10.

The placement of the permanent magnets and the magnetically permeable discs could alternatively be reversed so that the permanent magnets were embedded in insert 11. The securing force between magnets 17 and discs 34 and 35 is sufficient to maintain bottom plate 30 in substantial contact with tray 10 when cup bag 25 is empty of contents, and it is able to be manually separated by placement of a beverage container into cup bag 25.

Figure 3:
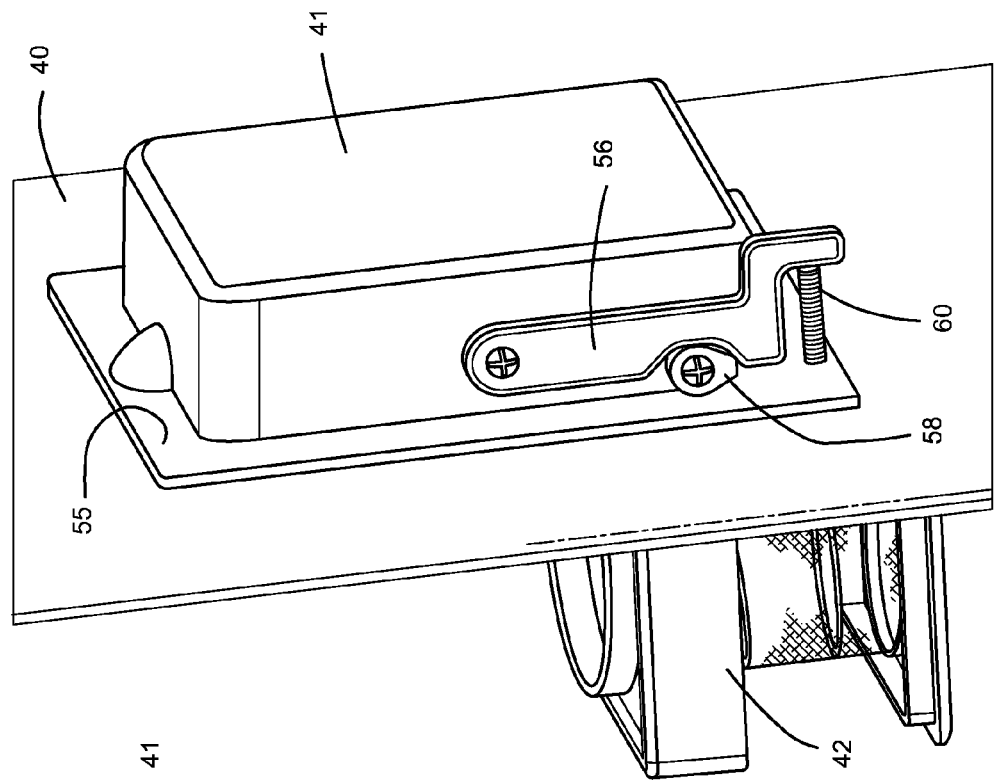
FIGS. 2 and 3 are perspective views of a fold-down embodiment of the cup holder.
Figure 4:
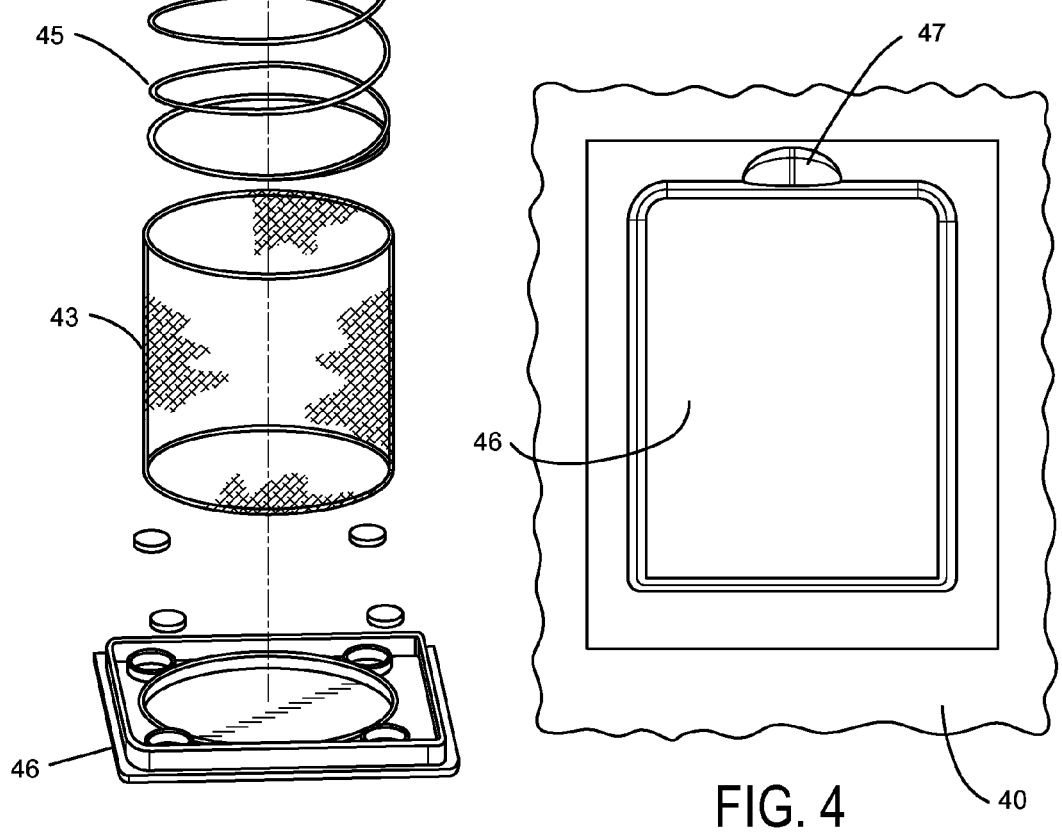
FIG. 4 is a front view of the cup holder of FIGS. 2 and 3 in a stowed position.
Figure 6:
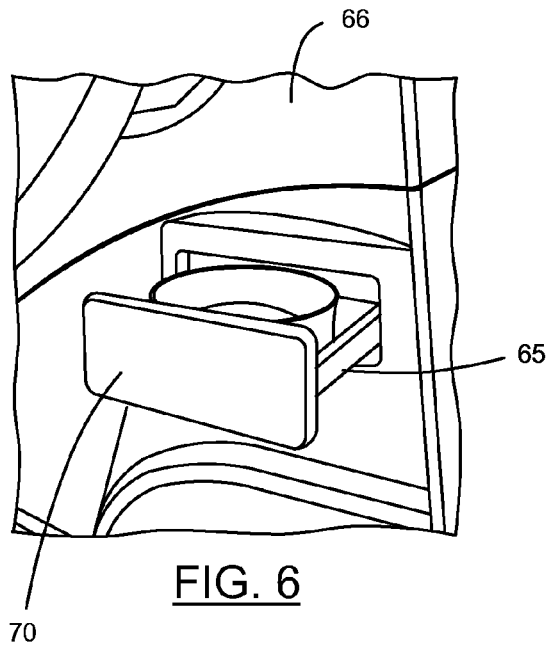
FIG. 6 is a perspective view of a sliding embodiment of the cup holder in a deployed position.
Figure 7:
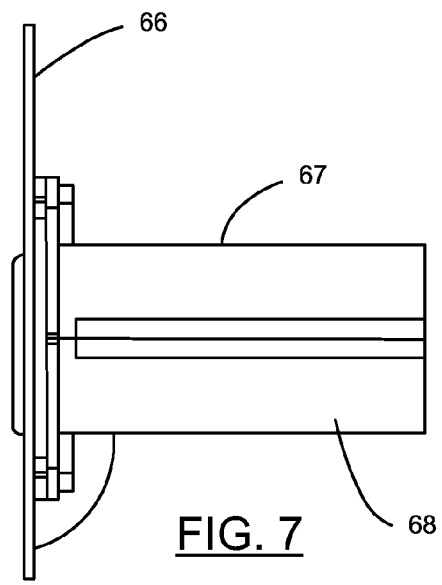
FIG. 7 is a side view of the cup holder of FIG. 6 in the stowed position.
Figure 8:
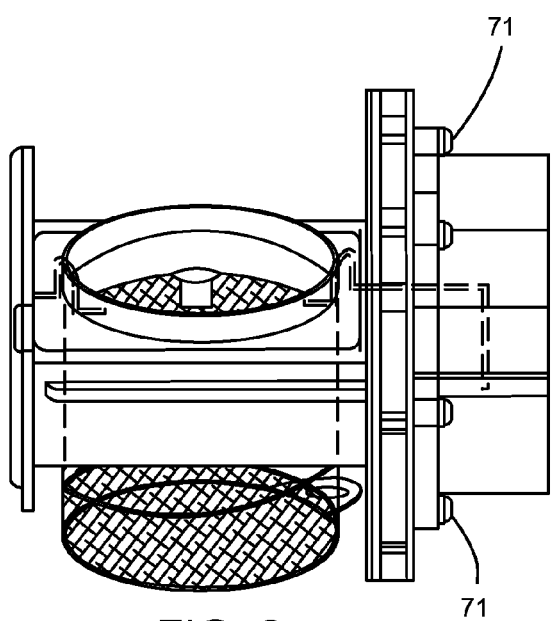
FIG. 8 is a side view of the cup holder of FIG. 6 in the deployed position.
Figure 9:
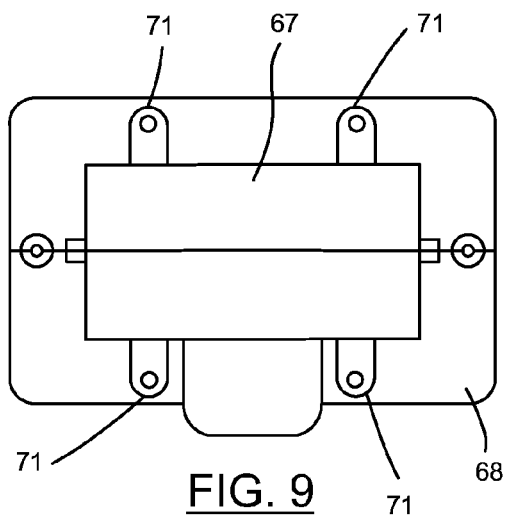
FIG. 9 is a rear view of the cup holder of FIGS. 6-8.

FIGS. 2-5 illustrate one embodiment for deploying a cup holder of the present invention. A vertical panel 40 includes a recess 41 for receiving a pivoting tray 42. A cup bag 43 is suspended from a collar 44 and has a coil spring 45 mounted between collar 44 and a bottom plate 46. Spring 45 is shown in an expanded state rather than its relaxed state which would collapse cup bag 43. As seen in FIG. 4, bottom plate 46 has an outward-facing surface having a color and texture to match surrounding panel 40 when in the stowed position. A finger slot 47 is provided at the top of recess 41 to facilitate the act of pivoting tray 42 forward out of recess 41.

Figure 2:
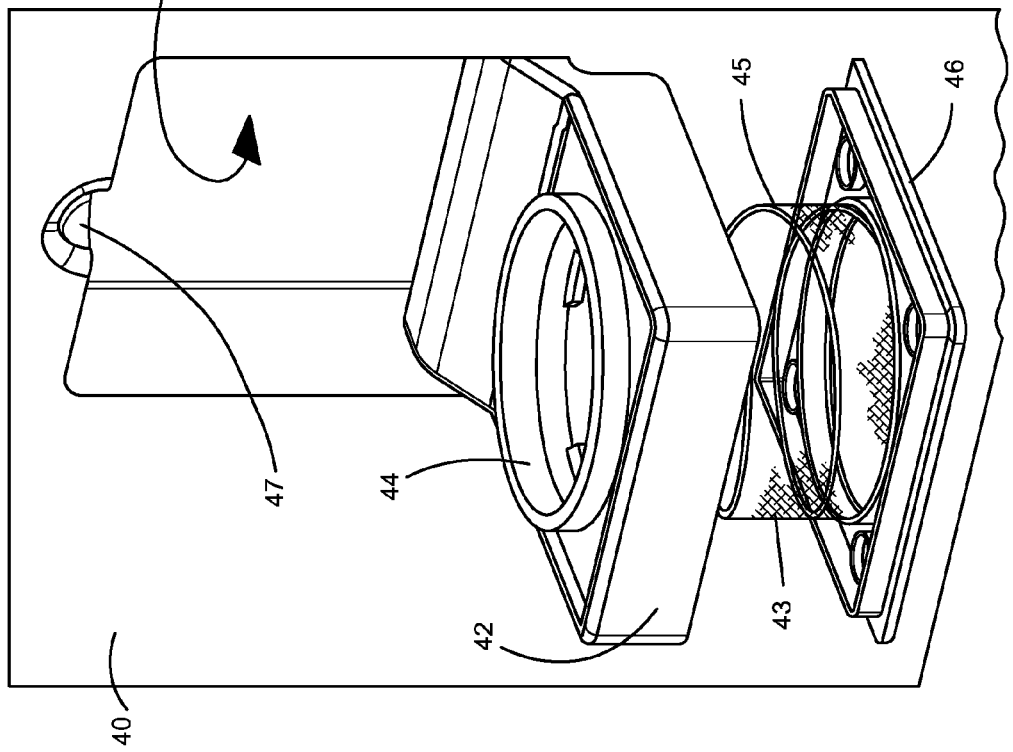
Figure 5:
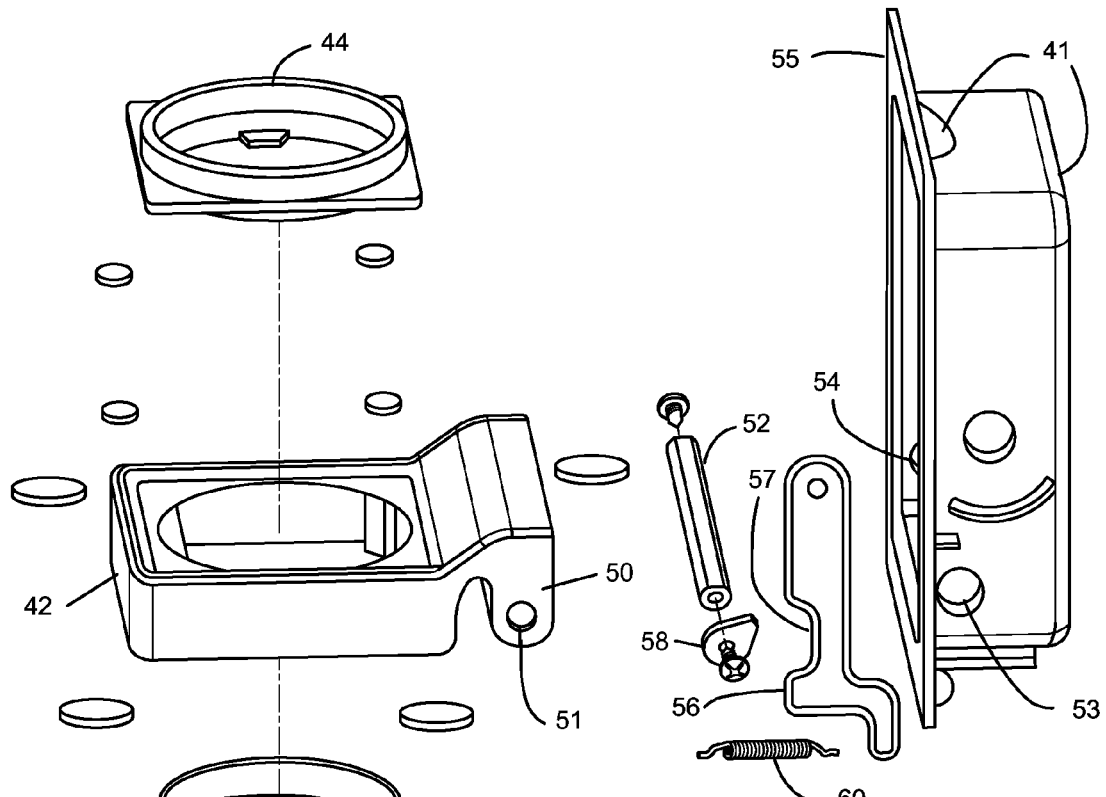
FIG. 5 is an exploded view of the cup holder of FIGS. 2-4.

FIGS. 2 and 3 show tray 42 in a deployed position and with cup bag 43 expanded to hold a beverage container (even though no beverage container is actually shown therein). As seen in the exploded view of FIG. 5, permanent magnets and magnetically permeable discs are employed as discussed in connection with FIG. 1. In this embodiment, bottom plate 46 is made with a larger profile than tray 42 in order to provide a flush appearance with panel 40. Therefore, bottom plate 46 may not be able to pass through tray 42 for removing the insert. Nevertheless, cup bag 43 may be detachable from bottom plate 46 for removal by using releasable fasteners such as snaps or hook and loop fasteners. Bag 43 may preferably have inner and outer layers with coil spring 45 placed between the layers. The layers may be sewn together with coil spring 45 placed between them in order to provide an attractive final appearance.

Tray 42 has a mounting boss 50 with a pivot hole 51 for receiving a pivot pin 52 that is attached to pivot holes 53 and 54 in recess 41. Recess 41 may be formed in a housing element 55 that is mounted to a corresponding aperture in vertical panel 40. A cam lever 56 is mounted to the outside of recess 41 and has a groove 57 for interacting with a cam element 58 that moves with pivot pin 52. A spring 60 is connected between cam lever 56 and boss 50 to provide a positive retention force for tray 42 at the stowed and deployed positions, respectively.

FIGS. 6-10 illustrate a drawer-type deployment mechanism for the cup holder of the present invention. A tray 65 is mounted for sliding out of and into a trim panel 66. Trim panel 66 may have an aperture for receiving a cup holder housing having an upper half 67 and a lower half 68 in a clam shell arrangement. A front trim piece 70 is attached to the front face of tray 65 and is provided with a color and texture to match panel 66. A plurality of fasteners 71 join housing halves 67 and 68 to a rear side of panel 66. An insert 75, cup bag 76, coil spring 77, and bottom plate 78 are similar to those shown in FIG. 1.

In each embodiment, the housing, tray, bottom plate, and finish pieces may preferably be molded of a polycarbonate, PVC, ABS, or other thermoplastics. The collapsible bag of the invention can collapse to a thin profile so that it can be retracted into the tray, and then both can be deployed in a manner that 1) slides between a stowed position behind a vertical panel and a deployed position in front of a vertical panel, or 2) pivots between a stowed position and a deployed position within an appropriate recess in a vertical panel. Other means of deployment will also be apparent to those skilled in the art, such as a combination of sliding and pivoting.

What is claimed is:

1. A cup holder for beverage containers comprising:
 a deployable tray movable between a deployed position and a stowed position, the tray having an upper surface, a lower surface, and an aperture;
 an insert comprising:
  a cup ring having an open collar for receiving a beverage container and having a seating flange configured to rest on the upper surface;
  a cup bag made of flexible material having a generally cylindrical shape between an upper rim and a bag bottom, the upper rim being affixed to the open collar; and
  a coil spring coupled between the cup ring and the bag bottom for urging them together for collapsing the cup bag, the coil spring being expandable under the weight of a beverage container placed on the bag bottom; and
 a housing for slidably receiving the tray and configured to mount to a vertical panel, wherein the tray slides between the stowed position being behind the vertical panel and the deployed position being in front of the vertical panel.

2. The cup holder of claim 1 wherein the cup bag is comprised of a woven, substantially waterproof fabric, and wherein the upper rim is inserting molded into the cup ring.

3. The cup holder of claim 1 wherein the cup bag has an inner layer and an outer layer, and wherein the coil spring is retained between the inner and outer layers.

4. A cup holder for beverage containers comprising:
 a deployable tray movable between a deployed position and a stowed position, the tray having an upper surface, a lower surface, and an aperture; and
 an insert comprising:
  a cup ring having an open collar for receiving a beverage container and having a seating flange configured to rest on the upper surface;
  a cup bag made of flexible material having a generally cylindrical shape between an upper rim and a bag bottom, the upper rim being affixed to the open collar;
  a coil spring coupled between the cup ring and the bag bottom for urging them together for collapsing the cup bag, the coil spring being expandable under the weight of a beverage container placed on the bag bottom;
  a bottom plate attached to the bag bottom; and
  a retainer for releasably securing the bottom plate to the lower surface, the retainer having a securing force 1)

sufficient to maintain the bottom plate in substantial contact with the tray when the cup bag is empty of contents, and 2) able to be manually separated by placement of the beverage container into the cup bag.

5. The cup holder of claim 4 wherein the retainer is comprised of a permanent magnet affixed to a first one of the lower surface of the tray or the bottom plate and a magnetically permeable element affixed to the other one of the lower surface of the tray or the bottom plate.

6. The cup holder of claim 5 wherein the bottom plate is comprised of a circular main body and a lateral tab receiving one of the permanent magnet or the magnetically permeable element.

7. The cup holder of claim 4 wherein the bottom plate is configured to pass through the aperture so that the insert is removable from the tray.

8. The cup holder of claim 7 wherein the bottom plate is comprised of a circular main body and a lateral tab, and wherein that aperture in the tray has a notch at a perimeter of the aperture through which the lateral tab passes to remove the insert from the tray.

9. The cup holder of claim 1 further comprising a releasable connection between the seating flange and the tray so that the insert is removable from the tray.

10. The cup holder of claim 1 wherein the cup ring is comprised of a thermoplastic elastomer.

11. The cup holder of claim 4 wherein the bottom plate is comprised of polycarbonate and the bag bottom is sewn to the bottom plate.

12. A cup holder for beverage containers comprising:
a deployable tray movable between a deployed position and a stowed position, the tray having an upper surface, a lower surface, and an aperture; and
an insert comprising:
a cup ring having an open collar for receiving a beverage container and having a seating flange configured to rest on the upper surface;
a cup bag made of flexible material having a generally cylindrical shape between an upper rim and a bag bottom, the upper rim being affixed to the open collar;
a coil spring coupled between the cup ring and the bag bottom for urging them together for collapsing the cup bag, the coil spring being expandable under the weight of a beverage container placed on the bag bottom; and
a releasable magnetic connection between the seating flange and the tray so that the insert is removable from the tray.

13. A cup holder for beverage containers comprising:
a deployable tray movable between a deployed position and a stowed position, the tray having an upper surface, a lower surface, and an aperture;
an insert comprising:
a cup ring having an open collar for receiving a beverage container and having a seating flange configured to rest on the upper surface;
a cup bag made of flexible material having a generally cylindrical shape between an upper rim and a bag bottom, the upper rim being affixed to the open collar; and
a coil spring coupled between the cup ring and the bag bottom for urging them together for collapsing the cup bag, the coil spring being expandable under the weight of a beverage container placed on the bag bottom; and
a housing with a recess for pivotably receiving the tray and configured to mount to a vertical panel, wherein the tray pivots between the stowed position being behind the vertical panel and the deployed position being in front of the vertical panel.

14. The cup holder of claim 13 wherein the cup bag is comprised of a woven, substantially waterproof fabric, and wherein the upper rim is inserting molded into the cup ring.

15. The cup holder of claim 13 wherein the cup bag has an inner layer and an outer layer, and wherein the coil spring is retained between the inner and outer layers.

16. The cup holder of claim 13 further comprising a releasable connection between the seating flange and the tray so that the insert is removable from the tray.

17. The cup holder of claim 13 wherein the cup ring is comprised of a thermoplastic elastomer.

\* \* \* \* \*